(12) United States Patent
Miyahara

(10) Patent No.: US 6,223,226 B1
(45) Date of Patent: Apr. 24, 2001

(54) DATA DISTRIBUTION SYSTEM AND METHOD FOR DISTRIBUTING DATA TO A DESTINATION USING A DISTRIBUTION DEVICE HAVING A LOWEST DISTRIBUTION COST ASSOCIATED THEREWITH

(75) Inventor: Koji Miyahara, Tokyo (JP)

(73) Assignee: Mitsubishi Denki Kabushiki, Tokyo (JP)

( * ) Notice: Subject to any disclaimer, the term of this patent is extended or adjusted under 35 U.S.C. 154(b) by 0 days.

(21) Appl. No.: 09/110,845

(22) Filed: Jul. 7, 1998

(30) Foreign Application Priority Data

Mar. 9, 1998 (JP) .................................. 10-057014

(51) Int. Cl.[7] .................................................. G06F 15/173
(52) U.S. Cl. .......................................... 709/241; 709/239
(58) Field of Search .................................... 709/241, 240, 709/239, 224, 226

(56) References Cited

U.S. PATENT DOCUMENTS

| | | | |
|---|---|---|---|
| 5,317,566 | * | 5/1994 | Joshi ...................................... 370/60 |
| 5,513,126 | | 4/1996 | Harkins et al. . |
| 5,657,461 | | 8/1997 | Harkins et al. . |
| 5,689,642 | | 11/1997 | Harkins et al. . |
| 5,712,788 | * | 1/1998 | Liaw et al. ........................ 364/449.3 |
| 5,712,907 | * | 1/1998 | Wegner et al. ...................... 379/112 |
| 5,806,061 | * | 9/1998 | Chaudhuri et al. ...................... 707/3 |
| 5,822,748 | * | 10/1998 | Cohen et al. ............................. 707/2 |
| 5,889,989 | * | 3/1999 | Robertazzi et al. ................. 395/675 |
| 5,938,720 | * | 8/1999 | Tamai .................................. 701/209 |

FOREIGN PATENT DOCUMENTS 774843   3/1995  (JP) .

* cited by examiner

*Primary Examiner*—Zarni Maung

(57) ABSTRACT

A data distribution system selects the distribution means having the most suitable distribution cost among a plurality of distribution means corresponding to a destination. The data distributing system includes a distribution information memory for storing a distribution information list including available distribution means corresponding to each of a plurality of destinations, a distribution cost memory for storing distribution cost information corresponding to a plurality of distribution means and distribution conditions, a selector for selecting distribution means having the lowest distribution cost for each destination from a plurality of the distribution means extracted from the destination information list stored in the distribution information memory corresponding to each destination when the destination information is inputted, referring to the distribution cost information, and a distribution data output apparatus for distributing the data to the destination using the distribution means selected by the selector.

4 Claims, 14 Drawing Sheets

DISTRIBUTION COST INFORMATION LIST

| DISTRIBUTION MEANS | DISTRIBUTION CONDITION | DISTRIBUTION COST |
|---|---|---|
| MAIL | NONE | 50 YEN |
| FACSIMILE | HEAD OF AREA CODE = 03 | 10 YEN |
| FACSIMILE | HEAD OF AREA CODE = 04 | 20 YEN |
| FACSIMILE | OTHERS | 60 YEN |
| ELECTRONIC MAIL | NONE | 0.5 YEN |

DESTINATION INFORMATION LIST 300

| DESTINATION | MAIL ADDRESS | FACSIMILE NUMBER | ELECTRONIC MAIL ADDRESS |
|---|---|---|---|
| Mr. Taro | Midori-ku, Yokohama ... | 045-123-xxxx | — |
| Miss. Hanako | Sumiyoshi-ku, Osaka ... | 06-789-yyyy | Hanako@yyy.jp |
| Mr. Ichiro | Chiyoda-ku, Tokyo ... | — | Ichiro@zzz.jp |

FIG. 10

DISTRIBUTION INFORMATION LIST

| DESTINATION | MAIL ADDRESS | FACSIMILE NUMBER | ELECTRONIC MAIL ADDRESS |
|---|---|---|---|
| Mr. Taro | Midori-ku, Yokohama ...... | | - |
| Miss. Hanako | Sumiyoshi-ku, Osaka ... | 06-789-yyyy | Hanako@yyy.jp |
| Mr. Ichiro | Chiyoda-ku, Tokyo .... | - | Ichiro@zzz.jp |

ERROR PATTERN LIST

| DISTRIBUTION MEANS | ERROR PATTERNS | KINDS OF ERRORS |
|---|---|---|
| ELECTRONIC MAIL | USER UNKNOWN | FATAL ERROR |
| ELECTRONIC MAIL | HOST UNKNOWN | FATAL ERROR |
| ELECTRONIC MAIL | DEFFERED | TEMPORARY ERROR |
| FACSIMILE | COMMUNICAION ERROR | FATAL ERROR |
| FACSIMILE | BUSY | TEMPORARY ERROR |

FIG. 12

DATA DISTRIBUTION SYSTEM AND METHOD FOR DISTRIBUTING DATA TO A DESTINATION USING A DISTRIBUTION DEVICE HAVING A LOWEST DISTRIBUTION COST ASSOCIATED THEREWITH

BACKGROUND OF THE INVENTION

1. Field of the Invention

The present invention relates to a data distribution system for distributing data to many destinations using a plurality of distribution means, and more particularly to a data distribution system for distributing the data to destinations by selecting the distribution means having the most suitable cost for each destination.

2. Description of the Related Art

Usually, in case of distributing data to many destinations such as members of institutes or customers of shops, the users select distribution means to distribute the data to the distribution address recorded in the member list or the customer list. Until now, it has been common practice to output the distribution addresses using a printer and to mail them.

As a result of the progress of information apparatuses and network technology, a system is suggested which selects one of the distribution means among a plurality of distribution means according to the communication environment of the destinations, and distributes the data to the destination using the selected distribution means.

For example, Japanese Laid-open patent publication No. 7-74843, Communication Terminal Apparatus discloses a system which converts the distribution data so that it coincides with the specified communication form, and automatically distributes it to the destination, upon inputting the destination information, distribution means and the distribution data, when the destination terminal has any one of the plurality of the distribution means such as voice communication, facsimile communication and data communication.

However, in a conventional data distribution system, the sender has to select the distribution means which has a suitable distribution cost when the destinations have a plurality of distribution means. Further, if the first selected distribution means cannot work at the destination, the same destination address of the destination is not used for further distribution. Therefore, there is a problem in that the data are not permanently distributed to the destination when the data could not be distributed by the first distribution means.

SUMMARY OF THE INVENTION

It is an object of the present invention to provide a distribution system for selecting one distribution means which can distribute the data at the suitable distribution cost if the destinations have a plurality of distribution means.

It is another object of the present invention to provide a distribution system for selecting a second distribution means which can distribute the data at the second best distribution cost, if the first distribution means cannot work.

It is a further object of the present invention to provide a distribution system for preventing further distribution of the data to the same destination, if the first destination did not respond.

It is a further object of the present invention to provide a distribution system for preventing further fatal distribution error after selecting other available distribution means.

According to one aspect of the invention, a data distributing system includes a distribution information memory for storing distribution information including available distribution means corresponding to each of a plurality of destinations, a distribution cost memory for storing distribution cost information corresponding to a plurality of distribution means and distribution conditions, a selector for selecting distribution means having the lowest distribution cost for each destination from a plurality of the distribution means extracted from the destination list information stored in the distribution information memory corresponding to each destination when the destination information is inputted, referring to the distribution cost information, and distribution data output apparatus for distributing the data to the destination using the distribution means selected by the selector.

According to another aspect of the invention, the selector receives distribution data quantity, stores new distribution cost information into the distribution cost memory based on the distribution data quantity, and selects distribution means having the lowest distribution cost for each destination based on the stored distribution cost information.

According to a further aspect of the invention, the selector modifies the destination information in the distribution information list stored in the distribution information memory upon receiving any distribution error message.

According to a still further aspect of the invention, the selector decides whether the data are re-distributed by the same distribution means, or the data are distributed by other distribution means available for the destination, according to distribution error messages.

According to a still further aspect of the invention, a data distributing system includes an analyzer for analyzing distribution error information upon receiving the distribution error information from the destination and notifying the selector of the kind of error. When the kind of error is a temporary error, the selector notifies the distribution data output apparatus of the destination information included in the error information, and the distribution data output apparatus re-distributes the data by the same distribution means, and when the kind of error is a fatal error, the selector selects other available distribution means, and notifies the distribution data output apparatus of the destination information included in the available distribution means, and the distribution data output apparatus distributes the data by the re-selected distribution means.

According to a still further aspect of the invention, a data distribution method includes the steps of storing distribution information including available distribution means corresponding to a plurality of destinations into a distribution information memory, storing distribution cost information corresponding to a plurality of distribution means and distribution conditions into a distribution cost memory, upon receiving destination information at the selector, extracting distribution means corresponding to the destination from the distribution information list, and selecting distribution means having the lowest distribution cost for each destination among a plurality of the extracted distribution means based on the distribution cost information, and distributing the data to the destination using the distribution means selected by the selector, at the distribution data output apparatus.

According to a still further aspect of the invention, a data distribution method includes the steps of receiving distribution data quantity, storing new distribution cost information into the distribution cost memory based on the distribution data quantity, and selecting distribution means having the lowest distribution cost for each destination based on the stored distribution cost information, at the selector.

According to a still further aspect of the invention, a data distribution method includes the step of deleting the distribution means corresponding to the destination upon receiving the distribution error message at the selector.

According to a still further aspect of the invention, a data distribution method includes the step of selecting other distribution means available for the destination upon receiving the distribution error message at the selector.

According to a still further aspect of the invention, a data distribution method further including the steps of: analyzing distribution error information at an analyzer upon receiving the distribution error information from the destination and notifying the selector of a kind of error, wherein, when the kind of error is a temporary error, notifying the distribution data output apparatus of the destination information included in the error information at the selector, and re-distributing the data by the same distribution means at the distribution data output apparatus, and when the kind of error is a fatal error, selecting other available distribution means, and notifying the distribution data output apparatus of the destination information included in the available distribution means at the selector, and distributing the data by the reselected distribution means at the distribution data output apparatus.

BRIEF DESCRIPTION OF THE DRAWINGS

The present invention will become more fully understood by the accompanying drawings which are given by way of illustration only, and thus are not limitative of the present invention and wherein:

FIG. 2 shows a distribution cost information in the data distribution system of the first embodiment of the present invention;

FIG. 3 shows a distribution information list in the data distribution system of the first embodiment of the present invention;

FIG. 10 shows a distribution information list in the data distribution system of the third embodiment of the present invention;

FIG. 12 shows examples of error patterns, to which an analyzer refers, in the data distribution system of the fourth embodiment of the present invention;

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Embodiment 1

Figure 1:
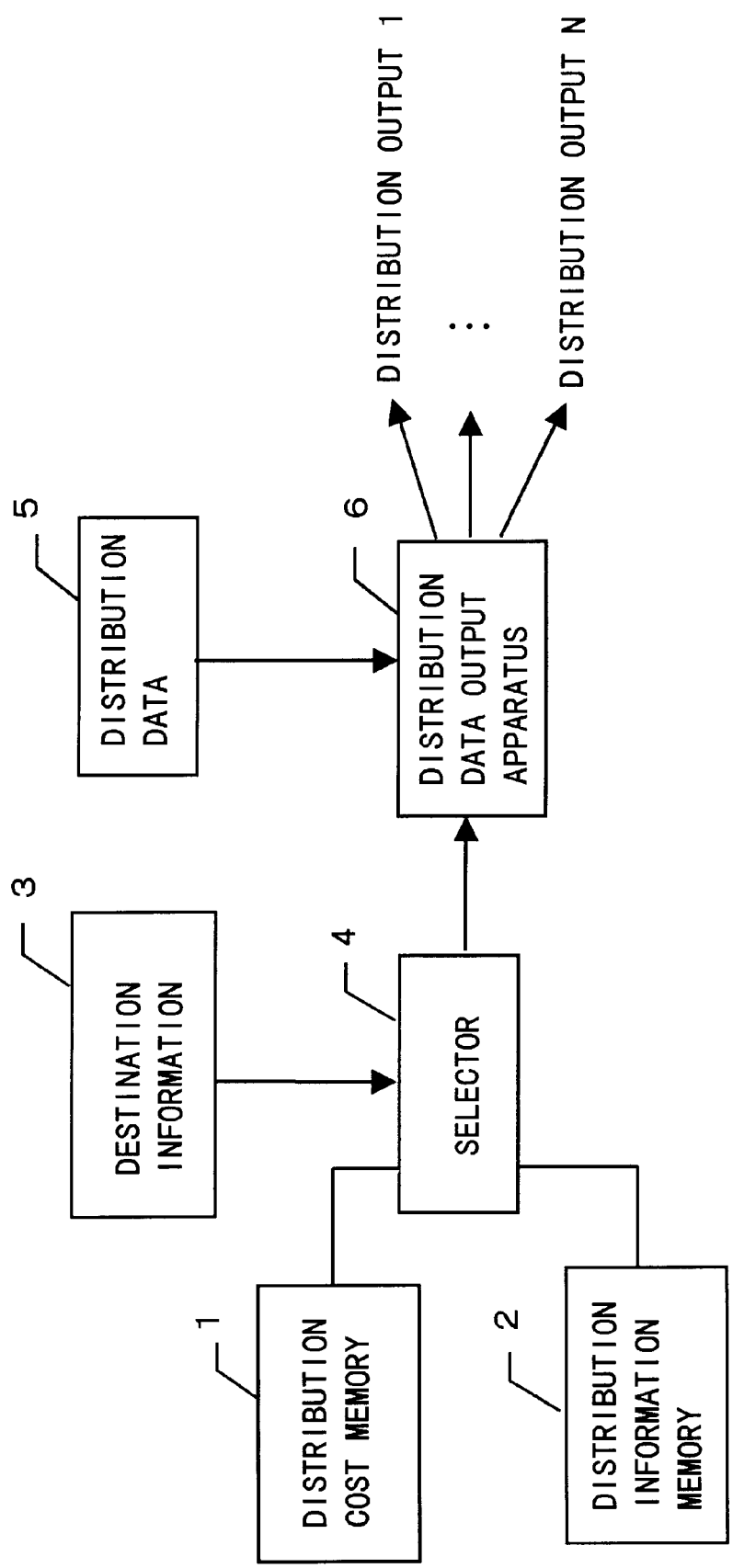
FIG. 1 shows a data distribution system of a first embodiment of the present invention.

A first embodiment of the present invention relates to a data distribution system which uses three types of distribution means, e.g. an electronic mail, a facsimile and a mail. The data distribution system of the first embodiment of the present invention is explained below using FIG. 1. FIG. 1 is a block diagram showing a general data distribution system of the first embodiment of the present invention. The data distribution system of FIG. 1 includes a distribution cost memory 1 for storing distribution cost information of each distribution means, a distribution information memory 2 for storing destination information which can be used by the distribution means to distribute data to any of the distribution destinations, destination information 3 including names of the destinations to which the data are distributed, a selector 4 for selecting the most suitable distribution means according to the destinations by referring to the distribution cost memory 1 and the distribution information memory 2, a distribution data 5 to be distributed, and a distribution data output apparatus 6 for distributing the distribution data 5 to the destinations.

In FIG. 1, when the user inputs the destination information 3 and the distribution data 5, the selector 4 obtains the available distribution means for each destination stored in the destination information 3 using the distribution list information stored in the distribution information memory 2, and selects the distribution means having the most suitable distribution cost for each destination by referring to the distribution cost list information stored in the distribution cost memory 1. Then the selector 4 notifies the distribution data output apparatus 6 of the distribution information corresponding to each destination. The distribution data output apparatus 6 distributes the distribution data 5 to the destination using the distribution means selected by the selector 4.

FIG. 2 shows an example of a distribution cost information list 200 stored in the distribution cost memory 1. The distribution cost information list 200 of FIG. 2 includes a field 201 indicating distribution means, a field 202 indicating distribution condition, and a field 203 indicating distribution cost. The selector 4 obtains a distribution cost by referring to the distribution means and the distribution condition in the distribution cost information list 200. For example, the selector 4 obtains the information that distribution cost of the facsimile is 10 Japanese yen if the area code of the destination begins with 03. The distribution cost is 20 Japanese yen if the area code of the destination begins with 04. The distribution cost is 60 Japanese yen if the area code of the destination begins with other numbers.

FIG. 3 shows an example of the destination information list 300 stored in the distribution information memory 2. The destination information list 300 of FIG. 3 includes a field 301 indicating destination, a field 302 indicating mail address corresponding to the destination, a field 303 indicating facsimile number corresponding to the destination, and a field 304 indicating electronic mail address corresponding to the destination. The destination information is created, for example, by the information provided by the user when he or she applies for membership of an institute or customer group, and is stored in the distribution information memory 2.

Figure 4:
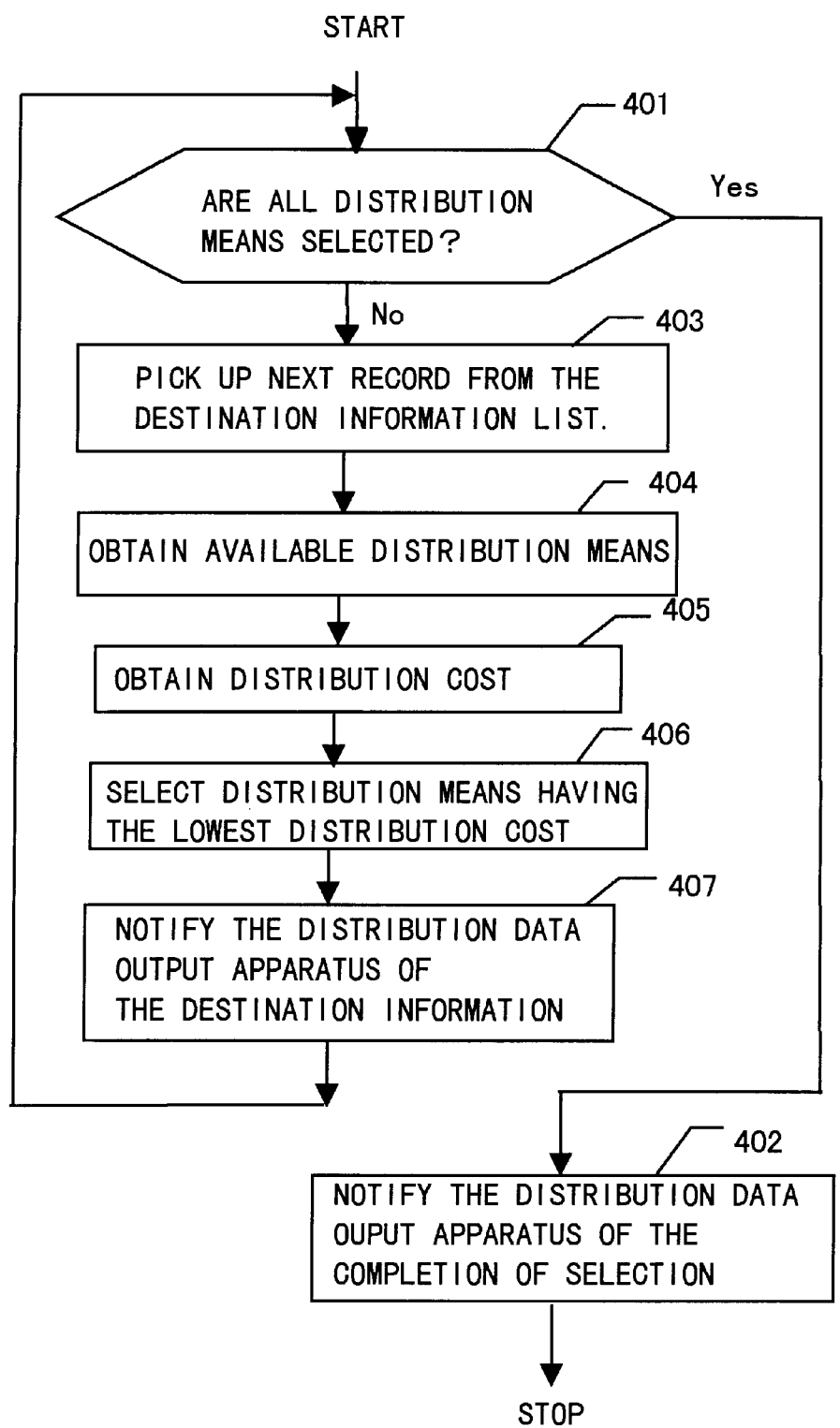
FIG. 4 is a flowchart showing the operation of a selector in the data distribution system of the first embodiment of the present invention.

The operation of the selector 4 is explained using the flowchart of FIG. 4. When the destination information 3 is input in the selector 4, the selector 4 selects whether the distribution means are selected for all destinations in step 401. If the distribution means for all destinations have been selected, in step 402, the selector 4 notifies the distribution data output apparatus 6 of the completion of selecting the distribution means, and terminates the selection. If selection of the distribution means is not completed, the selector 4 picks up the next destination record from the destination information 3 in a step 403. Then, in step 404, the selector 4 obtains available distribution means referring to the destination information list 300 stored in the distribution information memory 2. Then, in step 405, the selector 4 obtains a distribution cost for each distribution means obtained in step 404, referring to the distribution cost information list 200 stored in the distribution cost memory 1. In step 406, the selector 4 compares the distribution costs of respective distribution means and selects one of the distribution means which can distribute the data at the lowest distribution cost. In step 407, the selector 4 notifies the distribution data output apparatus 6 of the distribution information corresponding to each distribution means based on each destination information list 300 stored in the distribution information memory 2.

For example, assuming that the destination in the destination information 3 is "Mr. Taro", the selector 4 finds that the available distribution means are "mail" and "facsimile," referring to the destination information list 300 in FIG. 3 in step 404. In step 405, the selector 4 refers to the distribution cost information list 200 in FIG. 2 to find that the distribution cost of the mail is 50 Japanese yen and the distribution cost of the facsimile is 20 Japanese yen. In step 406, the selector 4 selects using the facsimile, whose cost is lowest among the available distribution means. In step 407, the selector 4 notifies the distribution data output apparatus 6 that the destination of the field 301 is "Mr. Taro," and the facsimile number of the field 303 is "045-123-xxxx," as destination information for the facsimile.

For example, if assuming that the destination in the destination information 3 is "Miss. Hanako", the selector 4 similarly finds that the available distribution means are "mail", "facsimile" and "electronic mail", referring to the destination information list 300 in FIG. 3 in step 404. Then, the selector 4 similarly refers to the distribution cost information list 200 in FIG. 2 to find that the distribution cost of the mail is 50 Japanese yen, the distribution cost of the facsimile is 60 Japanese yen and the distribution cost of the electronic mail is 0.5 Japanese yen. In step 406, the selector 4 selects using the electronic mail whose cost is lowest among the available distribution means. In step 407, the selector 4 notifies the distribution data output apparatus 6 of the information that the destination of the field 301 is "Miss. Hanako" and the electronic mail address in the field 304 is "Hanako @yyy.Jp", as destination information for the electronic mail.

The distribution data output apparatus 6 receives notice from the selector 4 that the selection for all destinations is complete, and outputs the distribution data 5 corresponding to each distribution means based on each destination information notified from the selector 4. For example, when the distribution means is electronic mail, the distribution data output apparatus 6 creates the electronic mail message and distributes it to the destination electronic mail address. When the distribution means is facsimile, the distribution data output apparatus 6 creates the facsimile data and distributes it to the destination facsimile number. When the distribution means is standard mail, the distribution data output apparatus 6 prints the mail address of the field 302 on an envelope or on a label sheet.

In the first embodiment of the present invention, standard mail, facsimile and electronic mail are used. However, the distribution means of the present invention is not limited by these three distribution means, as two distribution means or more can be used.

Embodiment 2

Figure 5:
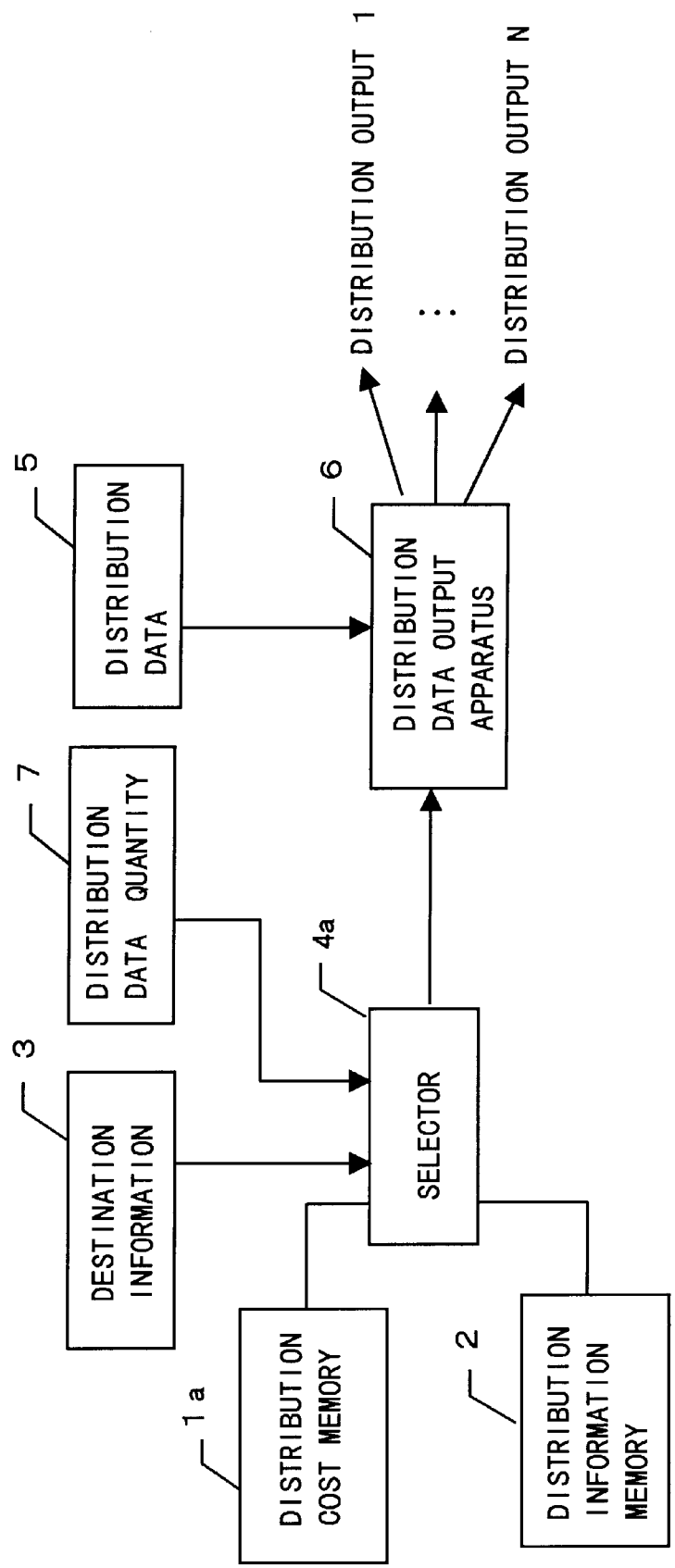
FIG. 5 shows a data distribution system of a second embodiment of the present invention.

The data distribution system of a second embodiment of the present invention is explained using FIG. 5. In FIG. 5, a distribution data quantity 7 indicates a distribution quantity for distributing the data. For the distribution quantity, it is, for example, the number of pages of the printed paper or the number of the transmission information bytes. The data distribution system of FIG. 5 includes a distribution cost memory 1a for storing a distribution cost information list 200a. The distribution cost information list 200a includes the information relating to the distribution data quantity 7 in addition to the distribution cost information list 200 of FIG. 2. In FIG. 5, a selector 4a executes the processes as explained later with reference to FIG. 8. In FIG. 5, the same components as those of FIG. 1 have the same numbers and therefore repeated explanation is omitted.

Figure 6:
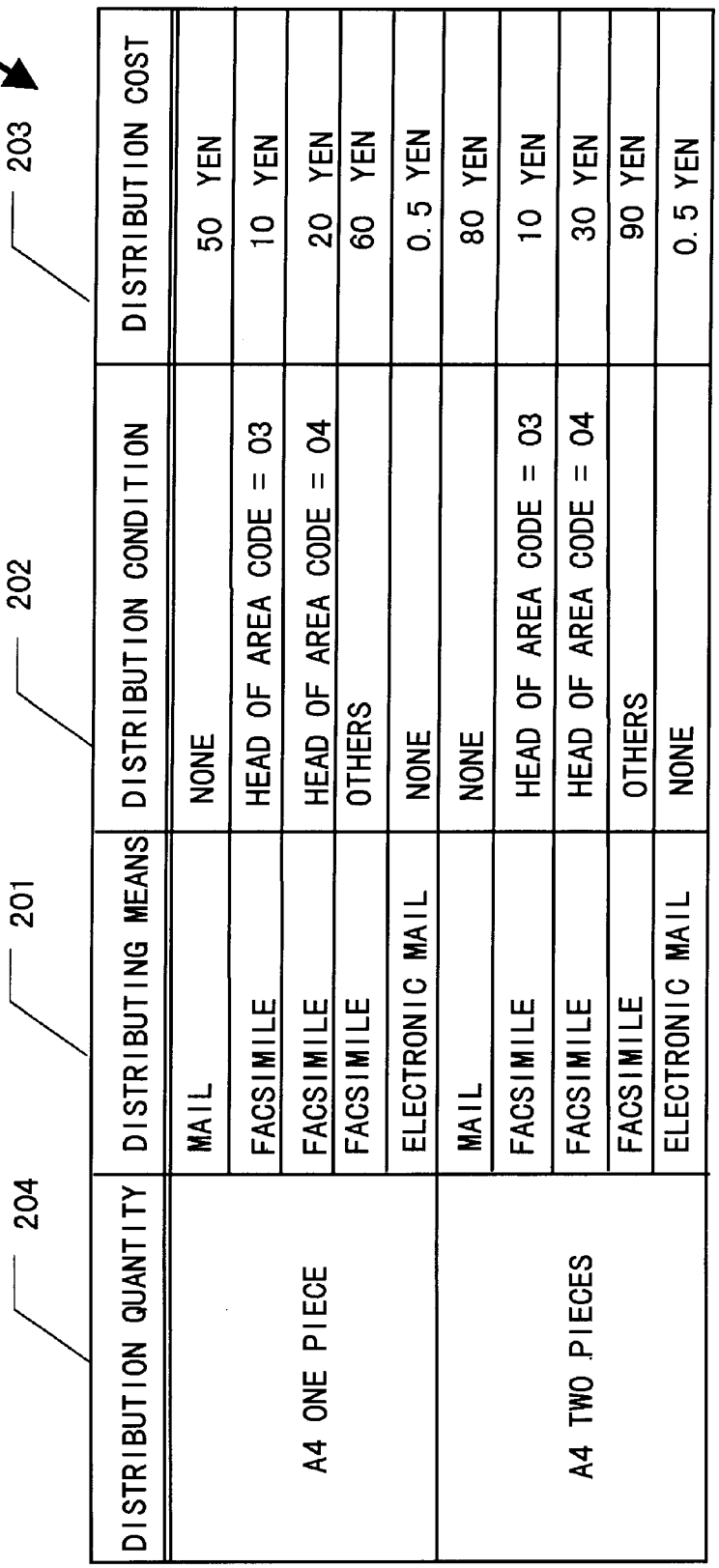
FIG. 6 shows a distribution cost information list in the data distribution system of the second embodiment of the present invention.

FIG. 6 shows an example of the distribution cost information list 200a, which is made from the distribution cost information list 200 of FIG. 2 by adding the information relating to the distribution data quantity 7. It is easily understood that the distribution cost depends on the distribution data quantity 204, if comparing the distribution cost information list 200a of FIG. 6 and the distribution cost information list 200 of FIG. 2. In the second embodiment of the data distribution system, the process is executed referring to the distribution cost information list 200a. In FIG. 6, the same components as those of FIG. 2 have the same numbers and therefore the repeated explanation is omitted.

In FIG. 5, when the user inputs the destination information 3, the distribution data 5 and the distribution data quantity 7, the selector 4 selects the available distribution means by referring to the distribution list stored in the distribution information memory 2 and the distribution cost information list 200a stored in the distribution memory 1a, so that the distribution cost becomes most suitable for each destination in the destination information 3. Then, the selector 4a notifies the distribution data output apparatus 6 of the distribution information corresponding to each destination. The distribution data output apparatus 6 distributes the distribution data 5 to the destination using the distribution means selected by the selector 4a.

FIG. 6 shows an example of the distribution cost information list 200a which is made based on the distribution data quantity 7 inputted by the user and stored in the distribution cost memory 1a. The distribution cost information list 200a of FIG. 6 includes a field 204 indicating distribution data quantity, a field 201 indicating distribution means, a field 202 indicating distribution condition and a field 203 indicating distribution cost. The selector 4*a* obtains the distribution cost by referring to the distribution data quantity, the distribution means and the distribution condition in the distribution cost information list 200*a*. For example, where the distribution data quantity refers to two pieces of A4 size paper and facsimile is selected as the distribution means, the selector 4 obtains the information that the distribution cost is 10 Japanese yen, if the area code of the destination begins with 03. The distribution cost is 30 Japanese yen if the area code of the destination begins with 04. The destination cost is 90 Japanese yen if the area code of the destination begins with other numbers.

Since the distribution information list 300 stored in the distribution information memory 2 is the same as that of the first embodiment shown in FIG. 3, repeated explanation is omitted.

Figure 7:
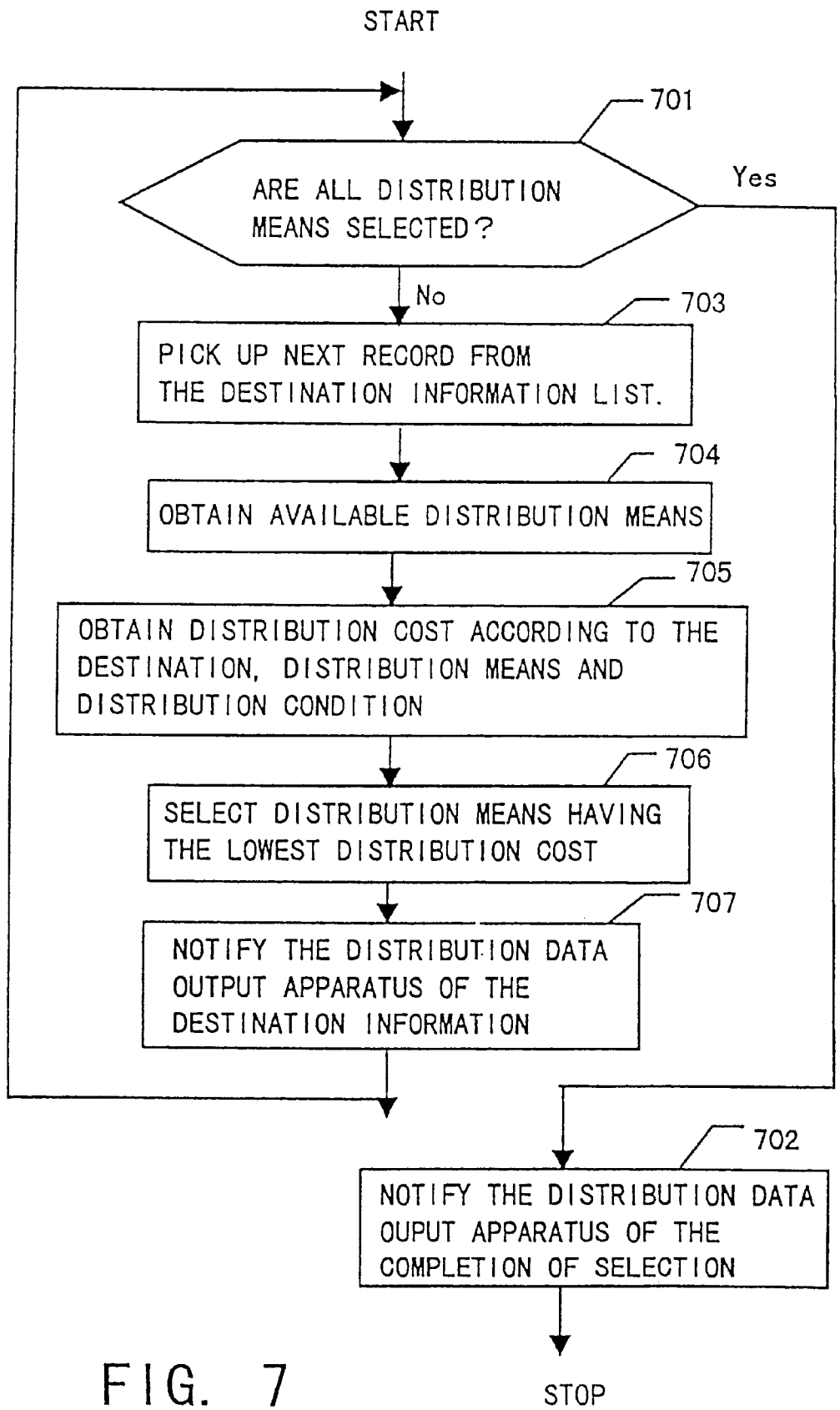
FIG. 7 is a flowchart showing the operation of a selector in the data distribution system of the second embodiment of the present invention.

The operation of the selector 4 is explained using the flowchart of FIG. 7. When the distribution data quantity 7 and the destination information 3 are input to the selector 4*a*, the selector 4*a* selects whether the distribution means are selected for all destinations in step 701. If the distribution means for all destinations have been selected, in step 702, the selector 4*a* notifies the distribution data output apparatus 6 of the completion of selecting the distribution means, and terminates the selection. If the selection of the distribution means is not completed, the selector 4*a* picks up the next destination record from the destination information 3 in step 703. Then, in step 704, the selector 4*a* obtains available distribution means referring to the destination information list 300 stored in the distribution information memory 2. Then, in step 705, the selector 4*a* obtains the distribution cost for each distribution means obtained in step 704, according to the distribution data quantity, the distribution means and the distribution condition in the distribution cost information list 200*a* stored in the distribution cost memory 1*a*. In step 706, the selector 4*a* compares the distribution cost of respective distribution means and selects one of the distribution means which can distribute the data at the lowest distribution cost. In step 707, the selector 4*a* notifies the distribution data output apparatus 6 of the distribution information corresponding to each distribution means based on each destination information list 300 stored in the distribution information memory 2.

For example, if assuming that the destination in the destination information 3 is "Mr. Taro", the selector 4*a* finds that the available distribution means are "mail" and "facsimile" referring to the destination information list 300 in FIG. 3 in step 704. In step 705, the selector 4*a* refers to the distribution cost information list 200*a* in FIG. 6 to find that the distribution cost of the mail is 80 Japanese yen and the distribution cost of the facsimile is 30 Japanese yen, where the distribution data quantity is two pieces of A4 size paper. In step 706, the selector 4*a* selects using the facsimile, whose cost is lowest among the available distribution means. In step 707, the selector 4*a* notifies the distribution data output apparatus 6 of the information that the destination of the field 301 is "Mr. Taro" and the facsimile number of the field 303 is "045-123-xxxx" as destination information for the facsimile.

For example, assuming that the destination in the destination information 3 is "Miss. Hanako", the selector 4*a* similarly finds that the available distribution means are "mail", "facsimile" and "electronic mail", referring to the destination information list 300 in FIG. 3 in step 704. Then, the selector 4*a* similarly finds that the distribution cost of the mail is 80 Japanese yen, the distribution cost of the facsimile is 30 Japanese yen and the distribution cost of the electronic mail is 0.5 Japanese yen, where the distribution data quantity is two pieces of A4 size paper. In step 706, the selector 4*a* selects using the electronic mail whose cost is lowest among the available distribution means. In step 707, the selector 4*a* notifies the distribution data output apparatus 6 of the information that the destination of the field 301 is "Miss. Hanako" and the electronic mail address in field 304 is "Hanako @yyy.Jp" as destination information for the electronic mail.

The distribution data output apparatus 6 receives notice from the selector 4*a* that the selection for all destinations is complete, and outputs the distribution data 5 corresponding to each distribution means based on each destination information notified from the selector 4*a*. For example, when the distribution means is electronic mail, the distribution data output apparatus 6 creates the electronic mail message and distributes it to the destination electronic mail address. When the distribution means is facsimile, the distribution data output apparatus 6 creates the facsimile data and distributes it to the destination facsimile number. When the distribution means is standard mail, the distribution data output apparatus 6 prints the mail address of field 302 in the destination information list 300 on an envelope or on a label sheet.

In the second embodiment of the present invention, standard mail, facsimile and electronic mail are used. However, the distribution means of the present invention is not limited by these three distribution means, as two distribution means or more can be used.

Embodiment 3

A data distribution system of the third embodiment of the present invention is explained below. The data distribution system of the third embodiment of the present invention uses electronic mail, facsimile and mail as the distribution means.

Figure 8:
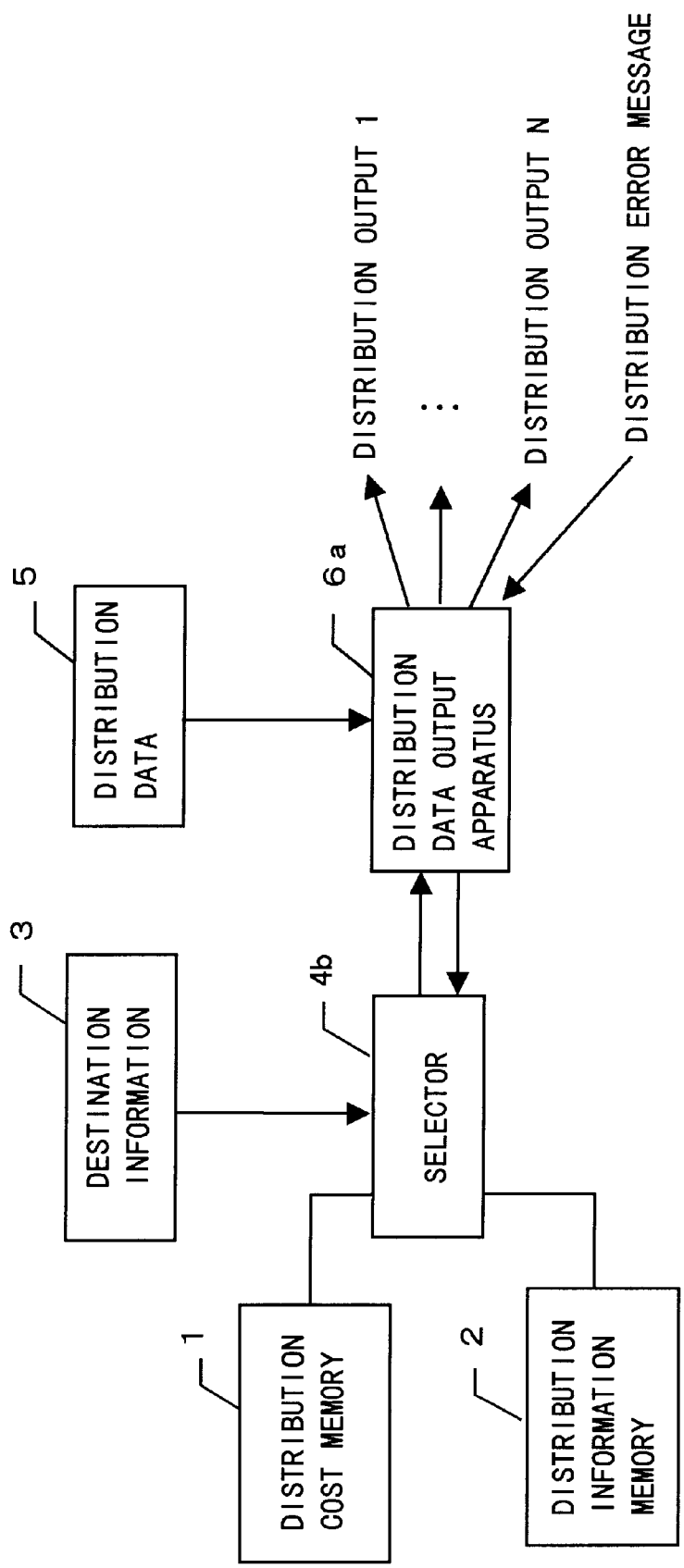
FIG. 8 shows a data distribution system of a third embodiment of the present invention.

FIG. 8 is a block diagram showing a data distribution system of the third embodiment of the present invention. In FIG. 8, a distribution data output apparatus 6*a* distributes distribution data 5 to the destination using each distribution means and receives error messages stating that the distributed data could not be distributed. In FIG. 8, the operation of a selector 4*b* is different from the selector 4 of the first embodiment of the present invention. The difference is described later. In FIG. 8, the same components as those of FIG. 1 have the same numbers and therefore repeated explanation is omitted.

The operation of the data distribution system of the third embodiment of the present invention is explained. In FIG. 8, when the user inputs the destination information 3, the selector 4*b* refers to the distribution information memory 2 and the distribution cost memory 1, and selects the distribution means whose cost is the most suitable for each destination. Then, the selector 4*b* notifies the distribution data output apparatus 6*a* of the destination information for each distribution means. The distribution data output apparatus 6*a* sends the distribution data using the distribution means selected by the selector 4*b*, based on the distribution information notified by the selector 4*b*. Since this operation is the same as that of the first embodiment, repeated explanation is omitted.

Further, the distribution data output apparatus 6*a* notifies the selector 4*b* of the errors which have occurred during the distribution and which have been returned after the distribution. Error messages are handled by the distribution data output apparatus 6*a* when distribution is impossible including, for example, unsuccessful communication error because of a wrong destination facsimile number or return electronic mail error because of a wrong electronic mail address. The operation of the selector 4b after receiving the error message from the distribution data output apparatus 6a is different from that of the operation of the selector 4 as explained below.

Figure 9:
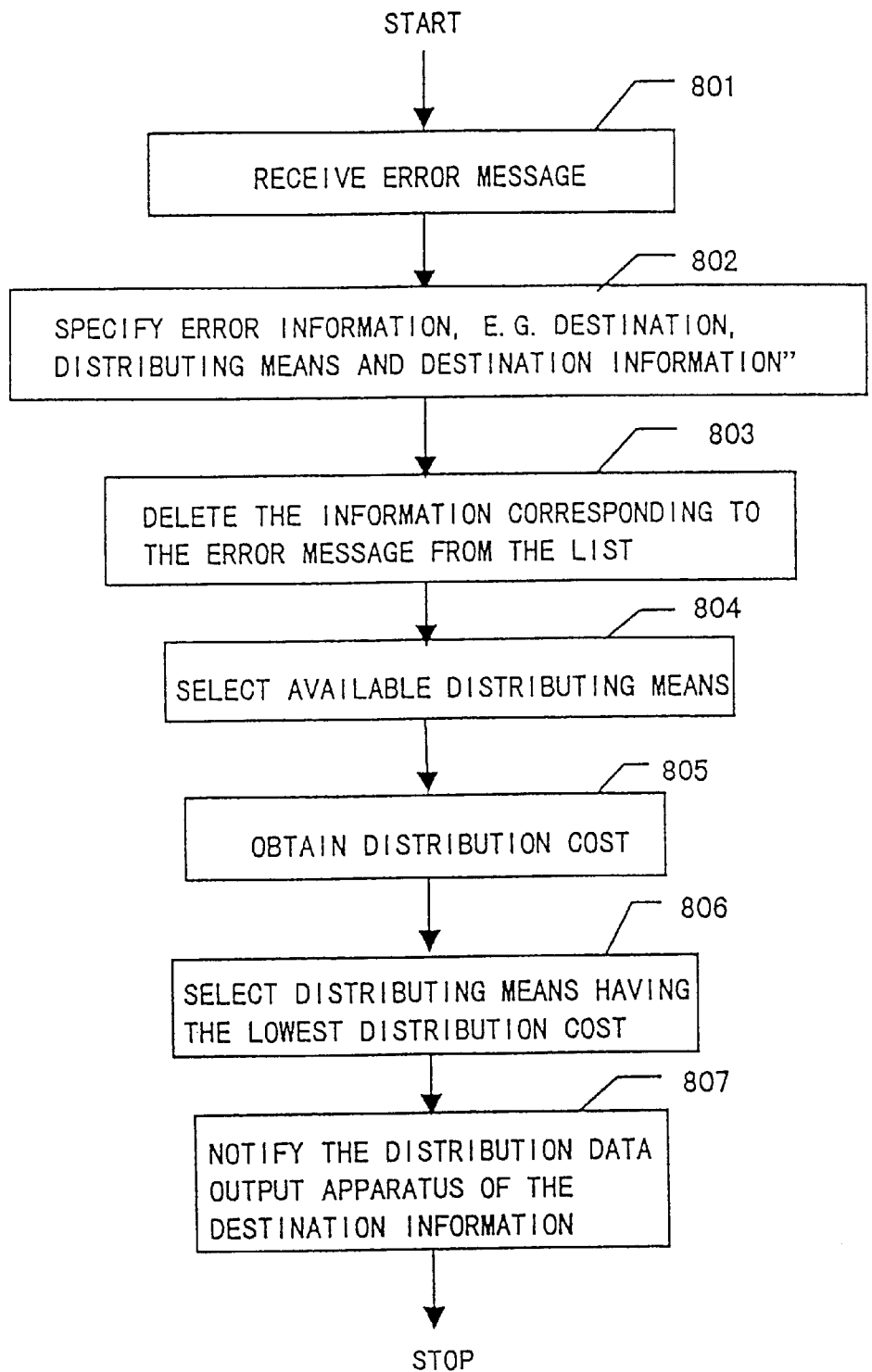
FIG. 9 is a flowchart showing the operation of a selector in the data distribution system of the third embodiment of the present invention.

The operation of the selector 4b after receiving the error message is explained using the flowchart in FIG. 9. In step 801, the distribution data output apparatus 6a receives a distribution error message from the destination and sends it to the selector 4b. In step 802, the selector 4b extracts the facsimile number or the electronic mail address included in the error message when it receives the error message from the distribution data output apparatus 6a. Then, the selector 4b specifies the destination by referring to the destination information 3 and the destination information list 300 in the distribution information memory 2, and creates a list having fields such as a destination field, a distribution means field and distribution information field corresponding to the data that could not be distributed. In step 803, the selector 4b deletes the information corresponding to the error specified in step 802 from the destination information list 300 stored in the distribution information memory 2. In step 804, the selector 4b selects the available distribution means. In step 805, the selector 4b obtains the respective distribution cost for each available distribution means by referring to the distribution cost information list 200 stored in the distribution cost memory 1. In step 806, the selector 4b compares the distribution costs obtained in step 805 to select the distribution means which can distribute the data at the lowest distribution cost. In step 807, the selector 4b extracts the distribution information corresponding to each distribution means from the distribution information memory 2 and sends it to the distribution data output apparatus 6a.

An example of the above is explained below. For example, in step 801, assume that the selector 4b receives a "distribution impossible" error message such as "the facsimile communication is impossible: 045-123-xxxx". In step 802, the selector 4b recognizes that facsimile distribution to the destination "Mr. Taro", having the facsimile number "045-123-xxxx" in the destination information list 300 stored in the distribution information memory 2 shown in FIG. 2, has failed.

In 803, the selector 4b deletes the facsimile number "045-123-xxxx" corresponding to "Mr. Taro" in field 303 from the destination information list 300 stored in the distribution information memory 2. FIG. 10 shows the contents of the destination information list 300b stored in the distribution information memory 2 where the above facsimile number "045-123-xxxx" has been deleted. Moreover, in the step 804, the selector 4b decides that an available distribution means is only the mail according to the information in the destination information list 300b shown in FIG. 10, and decides to use the mail as distribution means. Then the selector 4b notifies the distribution data output apparatus 6a that the destination is "Mr. Taro" and the destination address is "Midori-ku, Yokohama-shi, . . . ". In this example, since the distribution means is only standard mail, the lowest cost distribution means is not selected in step 806.

In step 807, the selector 4b sends destination information to be re-sent, namely, "Midori-ku, Yokohama-shi . . . ", which is the destination address in field 302, to the distribution data output apparatus 6a. The distribution data output apparatus 6a prints the mail address on an envelope or on a label sheet according to the re-sending distribution information received from the selector 4b and mails the distribution data to the destination.

In the third embodiment of the present invention, standard mail, facsimile and electronic mail are used. However, the distribution means of the present invention is not limited by these three distribution means, as two distribution means or more can be used.

Embodiment 4

The data distribution system of the fourth embodiment of the present invention is explained below. The data distribution system of the fourth embodiment of the present invention uses electronic mail, facsimile and standard mail as the distribution means in the same way as explained in the above embodiments.

Figure 11:
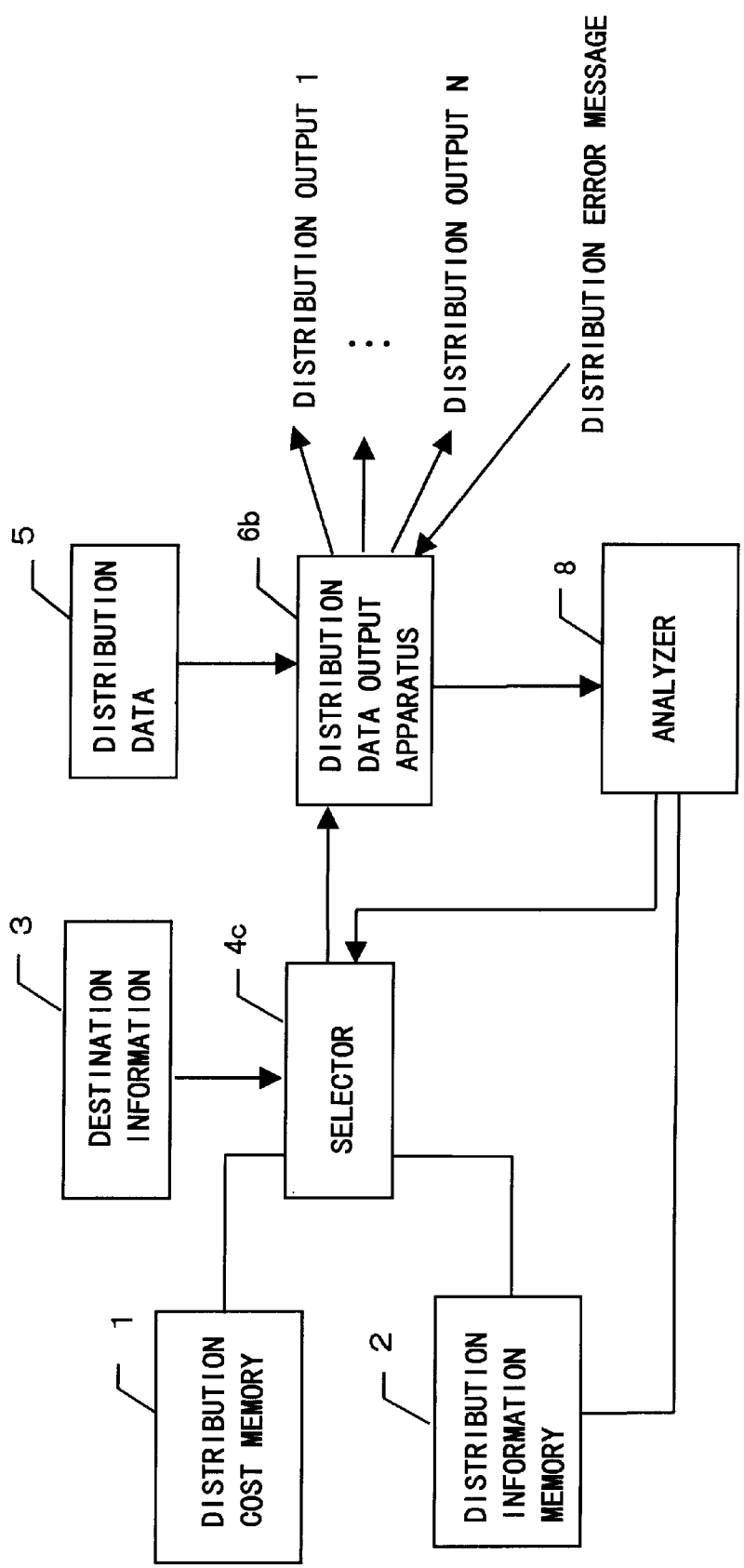
FIG. 11 shows a data distribution system of a fourth embodiment of the present invention.

FIG. 11 is a block diagram showing a data distribution system of the fourth embodiment of the present invention. In FIG. 11, an analyzer 8 receives an error message (e.g., "impossible distribution") from a distribution data output apparatus 6b and analyzes the error message, which is explained below. The distribution data output apparatus 6b is different from the distribution data output apparatus 6a of the third embodiment in that it receives an error message (e.g., "impossible distribution") and sends the error message to the analyzer 8. The operation of a selector 4c of the fourth embodiment is slightly different from the selector 4b. The differences in the operation are described later. In FIG. 11, the same components as those of FIG. 8 have the same numbers and therefore repeated explanation is omitted.

The operation of the data distribution system of the fourth embodiment is explained. In FIG. 11, when the user inputs the destination information 3, the selector 4c refers to the destination information list 300 stored in the distribution information memory 2 and the distribution cost information list 200 stored in the distribution cost memory 1, and selects the distribution means whose cost is the most suitable for each destination. Then the selector 4c notifies the distribution data output apparatus 6b of the destination information for each distribution means. The distribution data output apparatus 6b sends the distribution data using the distribution means selected by the selector 4c. Since this operation is the same as that of the first embodiment, repeated explanation is omitted.

Upon receiving notice that the error message impossible distribution occurred during the distribution or after the distribution, the distribution data output apparatus 6b notifies the analyzer 8 of the error message. The analyzer 8 analyzes the error message to pass the analyzed result to the selector 4c. The selector 4c updates the information in the destination information list 300 stored in the distribution information memory 2 according to the analyzed result. At the same time, the selector 4c sends information of the selected distribution means having the most suitable distribution cost and information in the destination information list 300 to the distribution data output apparatus 6b. The distribution data output apparatus 6b re-sends the distribution data 5 using the notified distribution means.

The analyzer 8 has error patterns which indicate different kinds of errors. Comparing the error message from the distribution data output apparatus 6b with the above error pattern, the analyzer 8 decides whether the error message impossible distribution relating the destination information is a fatal error or a temporary error. Then the analyzer 8 notifies the selector 4c of the analyzed result.

FIG. 12 shows an example of the error pattern list 110 which is included in the analyzer 8. The error pattern list 110 of FIG. 12 includes a field 111 indicating the distribution means, a field 112 indicating the error pattern and a field 113 indicating the kinds of errors. For example, when the error messages "impossible distribution" are of the patterns "Host Unknown" or "User Unknown" in case of electronic mail, the errors are fatal. When the error pattern is "Deferred", the error is temporary. When the error message "impossible distribution" is a "communication error" in the case of a facsimile, the error is "fatal". When the error message is "busy", the error is "temporary".

Figure 13:
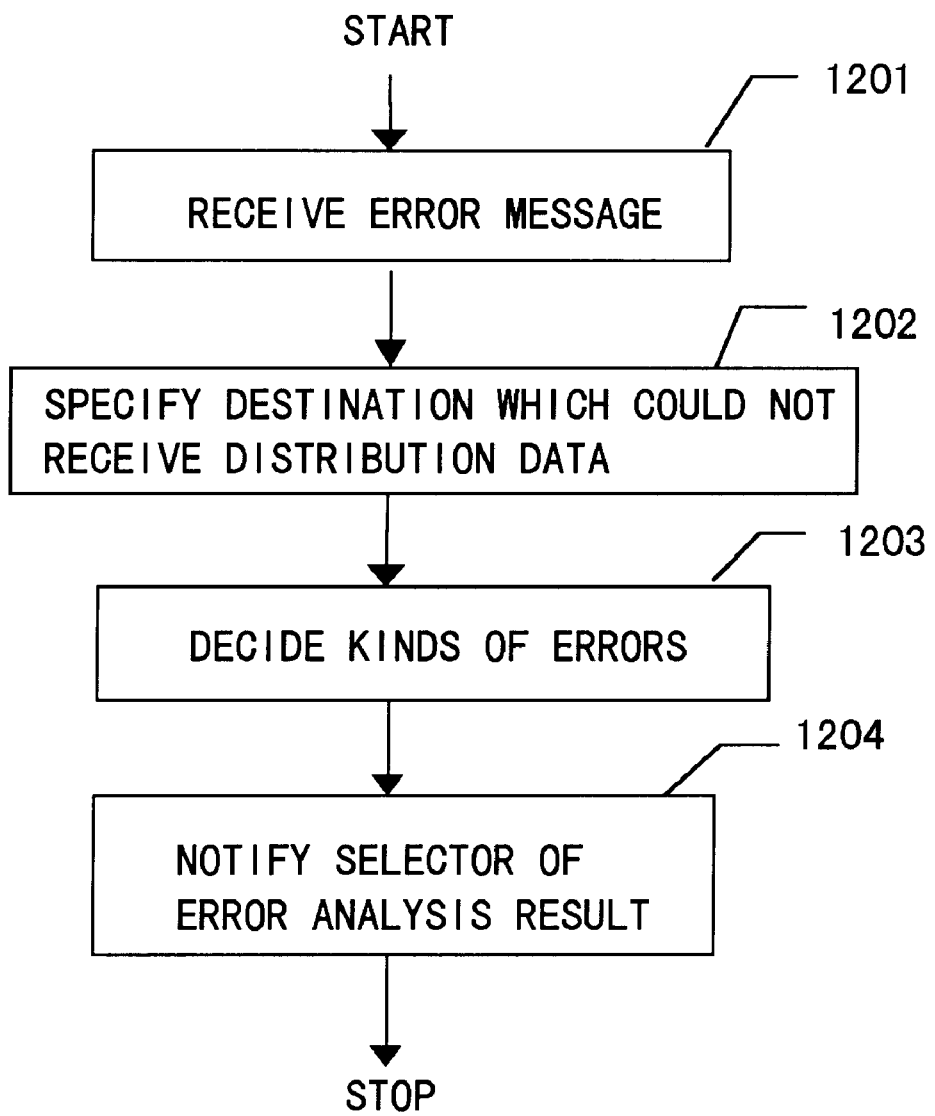
FIG. 13 is a flowchart showing the operation of the analyzer in the data distribution system of the fourth embodiment of the present invention.

The operation of the analyzer 8 is explained using the flowchart of FIG. 13. When the analyzer 8 receives the error message "impossible distribution" from the distribution data output apparatus 6b in step 1201, the analyzer 8 refers to the destination information list 300 stored in the distribution information memory 2 to specify the destination to which the data could not be distributed in step 1202. Then, in step 1203, the analyzer 8 compares the error message "impossible distribution" with the error patterns to decide the kinds of errors. In step 1204, the analyzer 8 notifies the selector 4c of the error information including the destination, the distribution means where the error has occurred, and the kind of errors. Then, the analyzer 8 terminates the analysis.

The operation of the selector 4c of the fourth embodiment of the present invention is explained. The selector 4c selects the suitable distribution means upon receiving the destination information 3 and notifies the distribution data output apparatus 6b of the suitable distribution means. Since the operation of the selector 4c is the same as that of the selector 4b in the third embodiment, repeated explanation is omitted. The operation of the selector 4c after receiving the error information from the analyzer 8 is different from that of the selector 4b of the third embodiment.

Figure 14:
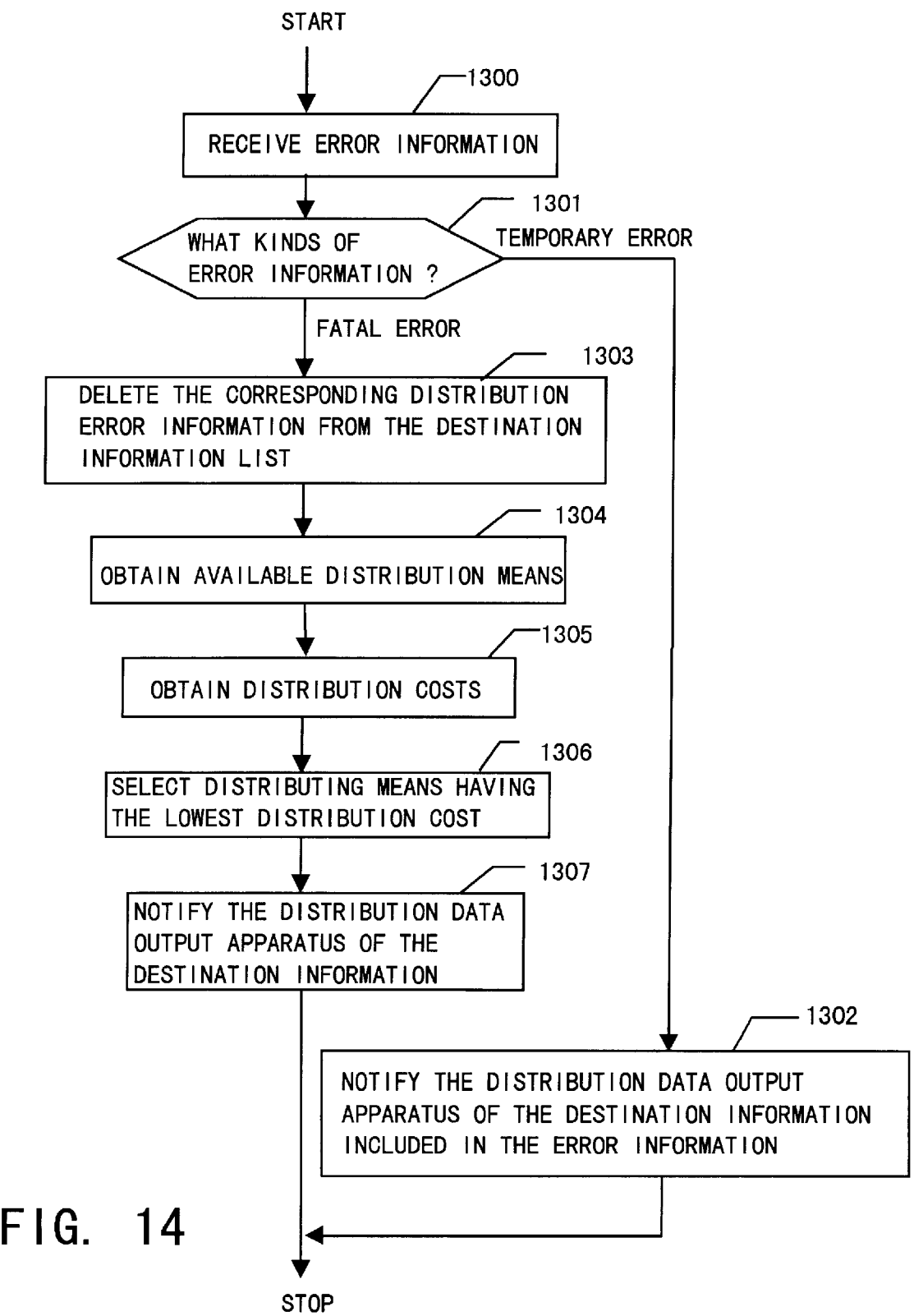
FIG. 14 is a flowchart showing the operation of a selector in the data distribution system of the fourth embodiment of the present invention.

The operation of the selector 4c after receiving the error information from the analyzer 8 is explained using the flowchart of FIG. 14. FIG. 14 is a flowchart showing the operation of the selector 4c in the fourth embodiment of the present invention. The selector 4c receives the error information from the analyzer 8 in step 1300, and decides whether the kind of error message is a fatal error or a temporary error, in step 1301. When the kind of error message is decided to be a temporary error in step 1301, the selector 4c notifies the distribution data output apparatus 6b of the distribution information of the destination and the distribution means included in the error information, in step 1302. Then, the selector 4c requests the distribution data output apparatus 6b to distribute the data again using the same distribution means.

If the error message is decided to be a fatal error in step 1301, the selector 4c deletes the destination information included in the error message information corresponding to the distribution means from the distribution information memory 2, in step 1303. In step 1304, the selector 4c obtains available distribution means which can distribute the data to the destination referring to the destination information list 300 stored in the distribution information memory 2. In step 1305, the selector 4c obtains the distribution cost for each available distribution means obtained in step 1304 referring to the distribution cost information list 200 stored in the distribution cost memory 1. In step 1306, the selector 4c compares the respective distribution costs obtained in step 1305 and selects the distribution means which can distribute the data at the lowest cost. In step 1307, the selector 4c sends the destination information in the destination information list 300 stored in the distribution information memory 2 to the distribution data output apparatus 6b according to the necessity. Then, the distribution data output apparatus 6b distributes the data.

In the fourth embodiment of the present invention, standard mail, facsimile and electronic mail are used. However, the distribution means of the present invention is not limited by these three distribution means, as two distribution means or more can be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data distributing system capable of distributing data to a destination using at least one distribution device having a lowest distribution cost associated therewith, comprising:
   a distribution information memory for storing distribution information including at least one available distribution device corresponding to each one of at least one destination;
   a distribution cost memory for storing distribution cost information corresponding to the at least one distribution device and distribution conditions;
   a selector for selecting the at least one distribution device having the lowest distribution cost for each one of the at least one destination from the at least one distribution device extracted from a destination information list stored in the distribution information memory corresponding to each one of the at least one destination when destination information is input, referring to the distribution cost information; and
   a distribution data output apparatus for distributing the data to the destination using the at least one distribution device selected by said selector;
   wherein upon receiving at least one distribution error message, said selector decides whether the data should be re-distributed using the same at least one distribution device, or whether the data should be re-distributed using another at least one distribution device available for the destination;
   said system further including:
      an analyzer for analyzing distribution error information upon receiving the at least one distribution error message from the destination and notifying said selector of a kind of error, wherein,
      when the kind of error is a temporary error, said selector supplies the distribution data output apparatus with destination information included in the distribution error information, and the distribution data output apparatus re-distributes the data using the same at least one distribution device, and
      when the kind of error is a fatal error, said selector selects another available at least one distribution device and supplies the distribution data output apparatus with destination information included in the other available at least one distribution device, and the distribution data output apparatus redistributes the data using the other available at least one distribution device.

2. A data distribution method for distributing data to a destination using at least one distribution device having a lowest distribution cost associated therewith, comprising the steps of:
   storing distribution information including at least one available distribution device corresponding to at least one destination into a distribution information memory;
   storing distribution cost information corresponding to the at least one distribution device and distribution conditions into a distribution cost memory;
   upon receiving destination information at a selector, extracting at least one distribution device corresponding to a destination from a distribution information list, and selecting a distribution device having the lowest distribution cost for the destination from the at least one extracted distribution device based on the stored distribution cost information; and distributing the data to the destination using the distribution device selected by the selector at a distribution data output apparatus;

selecting another distribution device available for the destination upon receiving distribution error message the selector;

analyzing distribution error information at an analyzer upon receiving the at least one distribution error message from the destination and notifying the selector of a kind of error, wherein, when the kind of error is a temporary error, supplying the distribution data output apparatus with destination information included in the distribution error information at the selector, and re-distributing the data using the same at least one distribution device at the distribution data output apparatus, and when the kind of error is a fatal error, selecting another available at least one distribution device and supplying the distribution data output apparatus with destination information included in the other available at least one distribution device at the selector, and re-distributing the data using the other at least one distribution device at the distribution data output apparatus.

3. A data distribution system capable of re-distributing data, in response to receiving at least one distribution error message from a distribution device, to a destination using at least one distribution device having a lowest distribution cost associated therewith, wherein the at least one received distribution error message is associated with a type of error, comprising:

an error analyzer for determining whether the at least one received distribution error message is associated with a type of temporary error or a type of fatal error and notifying a distribution device selector of the type of error, wherein, when the at least one received distribution error message is associated with the type of temporary error, said distribution device selector re-distributes the data, using the same at least one distribution device having the lowest distribution cost associated therewith, to the destination, and when the at least one received distribution error message is associated with the type of fatal error, said distribution device selector re-distributes the data, using another at least one available distribution device having the lowest distribution cost associated therewith, to the destination.

4. A data distribution method for re-distributing data, in response to receiving at least one distribution error message from a distribution device, to a destination using at least one distribution device having a lowest distribution cost associated therewith, wherein the at least one received distribution error message is associated with a type of error, comprising the steps of:

determining whether the at least one received distribution error message is associated with a type of temporary error or a type of fatal error, wherein, when the at least one received distribution error message is associated with the type of temporary error, the data are re-distributed, using the same at least one distribution device having the lowest distribution cost associated therewith, to the destination, and when the at least one received distribution error message is associated with the type of fatal error, the data are re-distributed, using another at least one available distribution device having the lowest distribution cost associated therewith, to the destination.

* * * * *